US008699529B2

United States Patent
Budianu et al.

(10) Patent No.: US 8,699,529 B2
(45) Date of Patent: Apr. 15, 2014

(54) BROADBAND PILOT CHANNEL ESTIMATION USING A REDUCED ORDER FFT AND A HARDWARE INTERPOLATOR

(75) Inventors: Petru Cristian Budianu, San Diego, CA (US); Arunava Chaudhuri, San Diego, CA (US); Raghu N. Challa, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 371 days.

(21) Appl. No.: 12/405,082

(22) Filed: Mar. 16, 2009

(65) Prior Publication Data

US 2009/0245090 A1 Oct. 1, 2009

Related U.S. Application Data

(60) Provisional application No. 61/040,449, filed on Mar. 28, 2008.

(51) Int. Cl.
*H04J 1/02* (2006.01)
*H04L 25/02* (2006.01)
*H04J 11/00* (2006.01)

(52) U.S. Cl.
CPC ........ *H04L 25/0202* (2013.01); *H04L 25/0232* (2013.01); *H04J 11/00* (2013.01)
USPC ............ 370/497; 370/210; 370/491; 370/500

(58) Field of Classification Search
CPC ............ H04L 25/0202; H04L 25/0232; H04L 25/0206; H04L 25/03292; H04W 24/02; H04J 11/00
USPC ................................ 370/497, 210, 491, 500
See application file for complete search history.

(56) References Cited

U.S. PATENT DOCUMENTS 5,414,734 A * 5/1995 Marchetto et al. ............ 375/267
5,694,388 A * 12/1997 Sawahashi et al. ........... 370/206
(Continued)

FOREIGN PATENT DOCUMENTS

CN 101102124 A 1/2008
KR 100773294 11/2007
(Continued)

OTHER PUBLICATIONS

International Search Report & Written Opinion—PCT/US2009/037438, International Search Authority—European Patent Office—Dec. 11, 2009.

(Continued)

*Primary Examiner* — Ricky Ngo
*Assistant Examiner* — Dewanda Samuel
(74) *Attorney, Agent, or Firm* — Donald C. Kordich

(57) ABSTRACT

Within a receiver, a channel estimation mechanism involves a hardware interpolator. In a first mode, narrowband pilot values are analyzed to generate channel parameters that are supplied to the interpolator such that the interpolator generates channel estimate values. The channel estimate values are used to demodulate a tile of a frame. In a second mode, broadband pilot values are supplied to an IFFT, thereby generating time domain values. After time domain processing, an FFT is employed to generate intermediate channel estimate values. These intermediate values are analyzed to determine channel parameters, which in turn are supplied to the hardware interpolator so that the interpolator generates a larger number of channel estimate values. After phase adjustment, the channel estimate values are used in demodulation. Use of the interpolator in the broadband mode allows the FFT employed to be of a smaller order, and to consume less power and/or processing resources.

12 Claims, 11 Drawing Sheets

(56) References Cited

U.S. PATENT DOCUMENTS

| | | | |
|---|---|---|---|
| 5,838,268 A * | 11/1998 | Frenkel | 341/111 |
| 6,654,429 B1 * | 11/2003 | Li | 375/316 |
| 6,931,054 B2 * | 8/2005 | Schmidt et al. | 375/148 |
| 7,058,134 B2 * | 6/2006 | Sampath | 375/260 |
| 7,424,274 B2 * | 9/2008 | Morris et al. | 455/102 |
| 7,436,759 B2 * | 10/2008 | Hayashi et al. | 370/208 |
| 7,450,653 B2 * | 11/2008 | Abe | 375/260 |
| 7,453,793 B1 | 11/2008 | Jones, IV et al. | |
| 7,535,820 B2 * | 5/2009 | Hayashi | 370/208 |
| 7,606,334 B2 * | 10/2009 | D'Amico et al. | 375/340 |
| 7,647,073 B2 * | 1/2010 | Sung et al. | 455/562.1 |
| 7,688,907 B2 * | 3/2010 | Dang | 375/260 |
| 7,778,337 B2 * | 8/2010 | Tong et al. | 375/260 |
| 7,822,156 B2 * | 10/2010 | Aytur et al. | 375/350 |
| 7,965,796 B2 * | 6/2011 | Kutz et al. | 375/340 |
| 8,259,854 B2 * | 9/2012 | Bastug et al. | 375/316 |
| 2005/0157810 A1 * | 7/2005 | Raleigh et al. | 375/267 |
| 2006/0203932 A1 * | 9/2006 | Palanki et al. | 375/295 |
| 2007/0195899 A1 | 8/2007 | Bhushan et al. | |
| 2008/0049814 A1 * | 2/2008 | Jeon | 375/147 |

FOREIGN PATENT DOCUMENTS

| | | |
|---|---|---|
| WO | WO2006099240 A1 | 9/2006 |
| WO | 2007094608 A1 | 8/2007 |

OTHER PUBLICATIONS

Richard Van Nee; Ramjee Prasad: "OFDM for Wireless Multimedia Communications" Jan. 1, 2000, Artech House, Inc., Norwood, MA, USA, XP002557426 p. 97-p. 103.

* cited by examiner

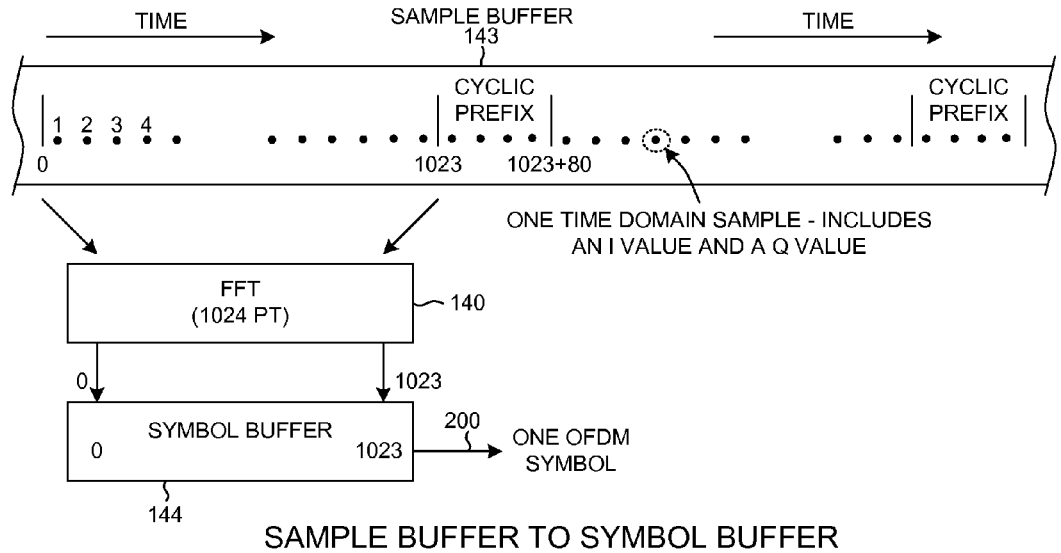
SAMPLE BUFFER TO SYMBOL BUFFER
FIG. 4
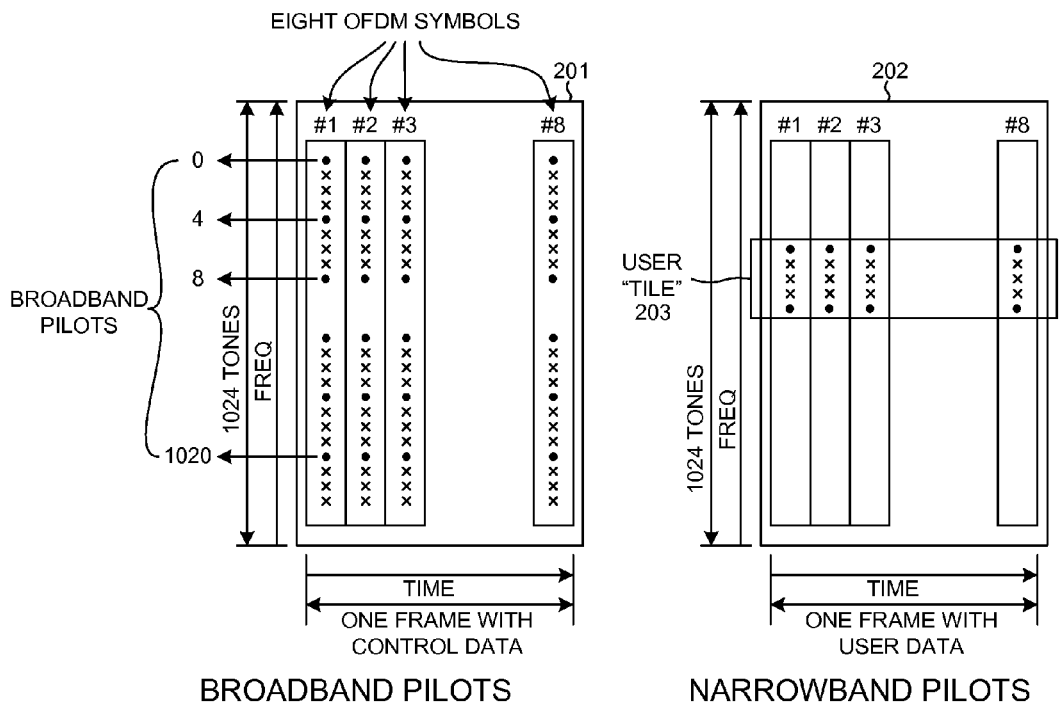
BROADBAND PILOTS
FIG. 5
NARROWBAND PILOTS
FIG. 6

SYMBOL BUFFER PUSH TASK INSTRUCTION

| 63 | | | | | | | | 0 |
|---|---|---|---|---|---|---|---|---|
| OP 4 | LN 8 | UNUSED 11 | T R 1 | TASK INDEX 8 | UNUSED 7 | I M 1 | A T 2 | RTC COUNT 22 |
| UNUSED 28 | | | | SMM TMODE 2 | TILE BUFFER DESTINATION ADDRESS 16 | | | SYMBOL BUFFER SOURCE ADDRESS 16 |
| S0 W12 IMAG U2 | | | | S0 W12 REAL U2 | S0 W22 REAL U2 | | | S0 W11 REAL U2 |
| UNUSED 29 | | | | S0 BETA SQ 9 | S0 W21 IMAG U2 | | | S0 W21 REAL U2 |
| S0 CI_DC21 IMAG U1 | | | | S0 CI_DC21 REAL U1 | S0 CI_DC11 REAL U1 | | | S0 CI_DC11 REAL U1 |
| S0 CI_DC22 IMAG U1 | | | | S0 CI_DC22 REAL U1 | S0 CI_DC12 REAL U1 | | | S0 CI_DC12 REAL U1 |
| S0 CI_DF21 IMAG U1 | | | | S0 CI_DF21 REAL U1 | S0 CI_DF11 REAL U1 | | | S0 CI_DF11 REAL U1 |
| S0 CI_DF22 IMAG U1 | | | | S0 CI_DF22 REAL U1 | S0 CI_DF12 REAL U1 | | | S0 CI_DF12 REAL U1 |
| S0 CI_DT21 IMAG U1 | | | | S0 CI_DT21 REAL U1 | S0 CI_DT11 REAL U1 | | | S0 CI_DT11 REAL U1 |
| S0 CI_DT22 IMAG U1 | | | | S0 CI_DT22 REAL U1 | S0 CI_DT12 REAL U1 | | | S0 CI_DT12 REAL U1 |

REPEAT FOR UP TO 5 SUB-TILES, S0, S1....S4

DEMOD MMSE TASK INSTRUCTION

FIG. 9

PLANAR ESTIMATION AND INTERPOLATION

HYBRID MODE AND PLANAR ESTIMATION MODE

HYBRID MODE AND PLANAR ESTIMATION MODE

PLANAR ESTIMATION MODE
OPERATION OF FIG. 11

BROADBAND PILOT CHANNEL ESTIMATION USING A REDUCED ORDER FFT AND A HARDWARE INTERPOLATOR

CROSS-REFERENCE TO RELATED APPLICATION

This application claims the benefit under 35 U.S.C. §119 of Provisional Application Ser. No. 61/040,449, filed Mar. 28, 2008, said provisional application is incorporated herein by reference.

BACKGROUND INFORMATION

1. Technical Field

The present disclosure relates to channel estimation in communication systems.

2. Background Information

In a wireless communication system, a transmitter typically encodes, interleaves, and modulates (i.e., symbol maps) traffic data to obtain data symbols. For a coherent system, the transmitter multiplexes pilot symbols with the data symbols, processes the multiplexed pilot and data symbols to generate a modulated signal, and transmits the signal via a wireless channel. The channel distorts the transmitted signal with a channel response and further degrades the signal with noise and interference. The transmitted signal may reach a receiver via a number of propagation paths. The characteristics of the propagation paths typically vary over time due to a number of factors. Different frequency sub-bands used for communication may experience different channel conditions and may have different signal-to-noise ratios (SNRs). An accurate estimate of the response of the channel between transmitter and receiver is therefore normally needed in order to communicate data effectively.

The receiver receives the pilot modulation symbols and processes the received pilot modulation symbols to obtain channel response estimates. Because the pilot modulation symbols have values that are known to the receiver, the receiver can estimate channel response based on a function of the pilot symbol values as received and the pilot symbol values that the receiver knows were transmitted. Once the channel estimate is made, the receiver uses the channel estimate to determine, from the received data modulation symbols, what the originally transmitted data modulation symbols were. The receiver then performs symbol demapping, de-interleaving, and decoding on the recovered data modulation symbols in accordance with the coding and modulation schemes used for the traffic data.

There are several different methods of performing channel estimation. In one method, only a small tile of the overall frequency-to-time frame of modulation symbol values is to be demodulated. This tile involves only a relatively small number of pilot modulation symbol values. These pilot values may be referred to as "narrowband" or "dedicated" pilot values. The receiver uses interpolation to interpolate channel characteristics between points of known channel characteristics given by the pilot values. The resulting channel estimates are used to determine, from the received data symbol values, what the originally transmitted data symbol values were.

In a second method, more numerous so-called "broadband" or "common" pilot modulation symbol values are distributed throughout the frequency-to-time frame. An Inverse Fast Fourier Transform (IFFT) function is used to convert the received pilots values into the time domain. The strongest pilots are identified in the time domain, and these strongest pilots are then zero padded. The zero-padded time domain result is converted into the frequency domain by a Fast Fourier Transform (FFT) function to generate a larger set of channel estimates, one for each modulation symbol value in the frequency-to-time frame. In some circumstances and applications, the channel estimation operations performed by the receiver may consume an undesirably large amount of processing power, may require an undesirably large amount of dedicated hardware to be included in the receiver, and/or may cause the receiver to consume an undesirably large amount of power.

SUMMARY

Within a receiver, a channel estimation mechanism involves a hardware interpolator. In a first mode, narrowband pilot modulation symbol values are analyzed to generate channel parameters, and the channel parameters are supplied to the hardware interpolator such that the hardware interpolator generates channel estimate values used in demodulation. The channel estimate values may, for example, be used to demodulate a tile of a frame, where the tile includes the narrowband pilot values.

In a second mode, broadband pilot modulation symbol values are supplied to an Inverse Fast Fourier Transform (IFFT) function, thereby generating time domain values. After time domain processing such as thresholding and tap selection and zero padding, a Fast Fourier Transform (FFT) function is employed to generate intermediate channel estimate values. These intermediate channel estimate values are analyzed to determine channel parameters, which in turn are supplied to the hardware interpolator so that the hardware interpolator generates a larger number of channel estimate values used to demodulate the frame. The use of the hardware interpolator in this way introduces a time offset that is different for each frequency of values. A phase adjustment coefficient is therefore calculated for each frequency, and the hardware interpolator uses the phase adjustment coefficients to perform time offset correction in the frequency domain by multiplying each post-FFT frequency band by its respective phase adjustment coefficient, thereby effectively shifting the signal in the time domain back to where it should have been had no time offset occurred. Use of the hardware interpolator in the broadband pilot channel estimation mode allows the FFT employed in that mode to be of a relatively small order, and therefore allows the overall channel estimation mechanism to consume less power and/or to consume fewer processing resources.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

FIG. 4 is diagram that illustrates the generation of an OFDM symbol by the FFT WCSMSC 140 of FIG. 3.

FIG. 5 is a diagram that illustrates a frame involving "broadband" pilot modulation symbol values.

FIG. 6 is a diagram that illustrates a frame involving "narrowband" pilot modulation symbol values.

FIG. 9 is a diagram of a DEMOD MMSE task instruction.

DETAILED DESCRIPTION

Figure 1:
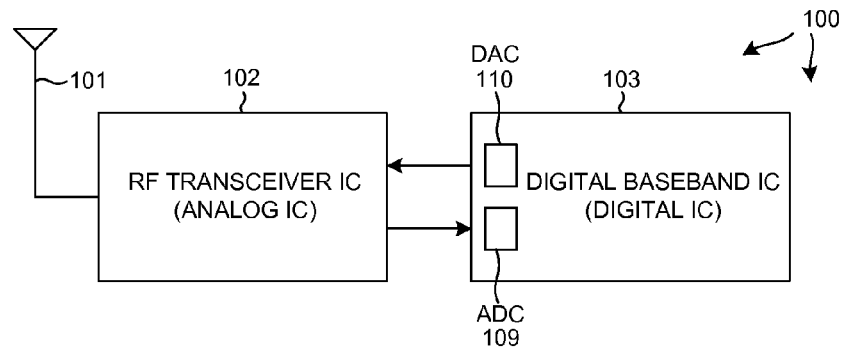
FIG. 1 is a simplified high level block diagram of a mobile communication device 100 in accordance with one novel aspect.

FIG. 1 is a simplified high level block diagram of an example of a wireless communication device 100. Wireless communication device 100 includes, among other parts not illustrated, an antenna 101, a Radio Frequency (RF) integrated circuit 102, and a digital baseband integrated circuit 103.

Figure 2:
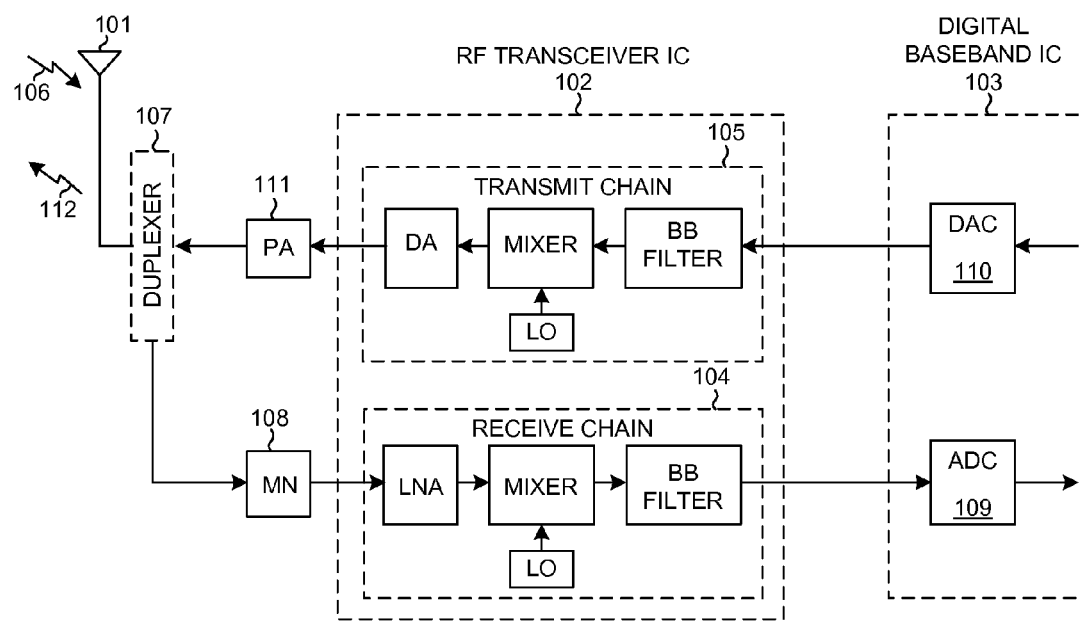
FIG. 2 is a more detailed block diagram of the RF transceiver integrated circuit 102 of the mobile communication device of FIG. 1.

FIG. 2 is a more detailed block diagram of the antenna 101 and the RF transceiver integrated circuit 102 of FIG. 1. The RF transceiver integrated circuit 102 includes a receive chain 104 and a transmit chain 105. An incoming transmission 106 is received on antenna 101, and passes through a duplexer 107 and a matching network 108 and into the receive chain 104. After being downconverted in frequency in receive chain 104, the received signal passes to an Analog-to-Digital Converter (ADC) 109 in the digital baseband integrated circuit 103. ADC 109 converts the signal into digital samples for further processing. If wireless communication device 100 is to make a transmission, then digital information is converted into analog form by a Digital-to-Analog Converter (DAC) 110 in the digital baseband integrated circuit 103. The resulting analog signal is then upconverted in frequency by transmit chain 105 of the RF transceiver integrated circuit 102, and the resulting RF signal is amplified by power amplifier PA 111. The amplified signal passes through duplexer 107 and to antenna 101 for transmission as outgoing transmission 112.

Figure 3:
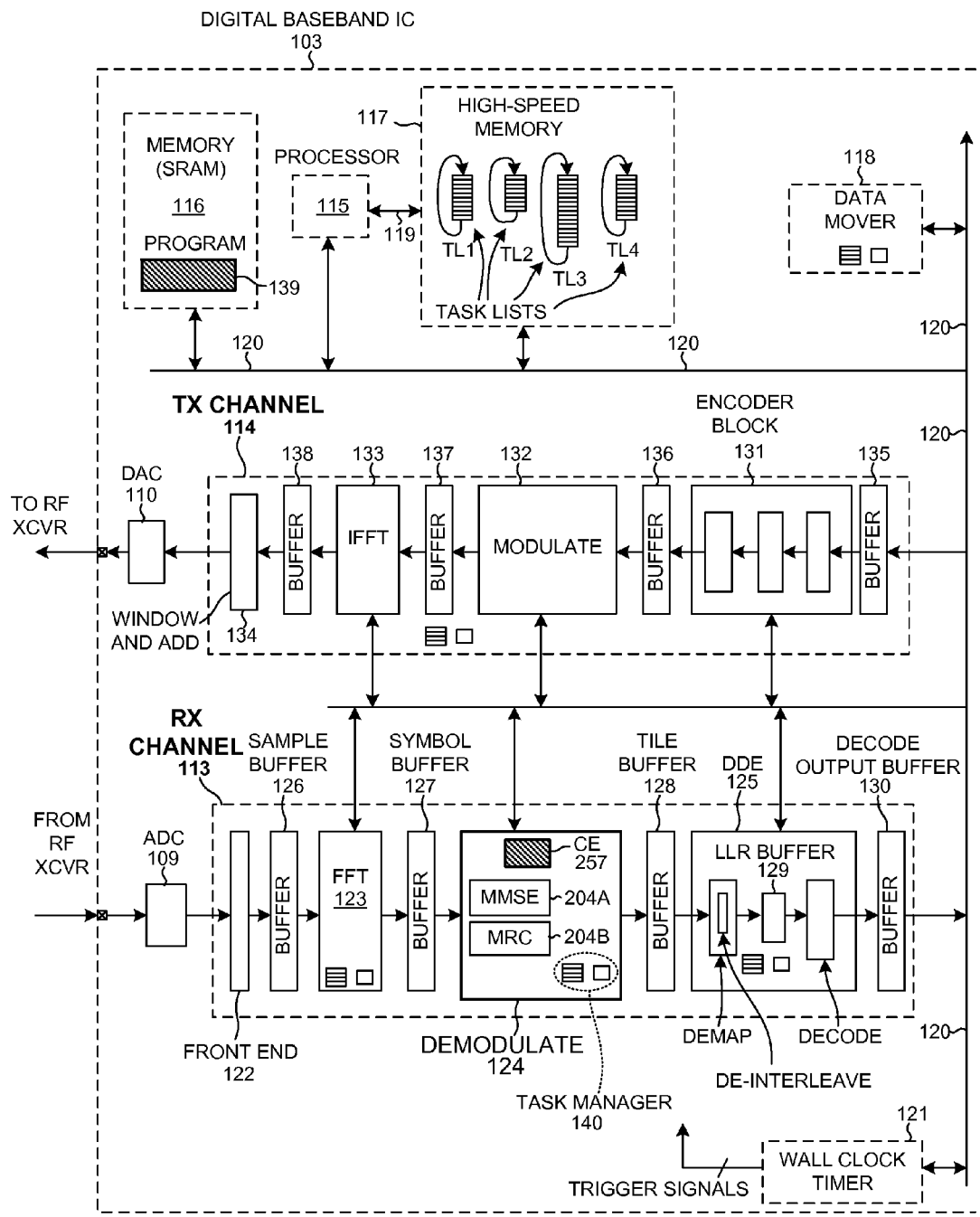
FIG. 3 is a more detailed diagram of the digital baseband integrated circuit 103 of the mobile communication device of FIG. 1.

FIG. 3 is a more detailed block diagram of digital baseband integrated circuit 103 of FIG. 2. Digital baseband integrated circuit 103 includes, among other portions not illustrated, ADC 109, a receive channel 113, a transmit channel 114, DAC 110, a processing circuit 115, an amount of memory 116, an amount of high-speed memory 117, a data mover engine 118, a first bus 119, a second bus 120, and a wall clock timer 121. Receive channel 113 in turn includes a set of processing blocks 122-125, referred to here as Wireless Communication System Modem Sub-Circuits (WCSMSCs) organized in a chain to process a stream of incoming data. These WCSMSCs include a front end WCSMSC 122, a Fast Fourier Transform (FFT) WCSMSC 123, a demodulate (DEMOD) WCSMSC 124, and a Demap/De-Interleave/Decode (DDE) WCSMSC 125. DDE WCSMSC 125 in turn includes a demapper portion, and LLR buffer 129, and a decoder block.

Data flow passing through the various WCSMSCs of the receive channel 113 is buffered by buffers 126-130 including sample buffer 126, symbol buffer 127, tile buffer 128, LLR buffer 129, and decode output buffer 130. The general path of receive channel data is from left to right in FIG. 3 through circuits 109, 122, 126, 123, 127, 124, 128, 125, 130 to second bus 120. Similarly, transmit channel 114 includes a corresponding set of WCSMSCs 131-134 and buffers 135-138. The general path of transmit channel data is from right to left in FIG. 3 from second bus 120, to 135, 131, 136, 132, 137, 133, 138, 134, and 110.

In the present example, processing circuit 115 includes multiple processors including a Digital Signal Processor (DSP) and a general purpose processor. The DSP can carry out Fast Fourier Transform (FFT) and Inverse Fast Fourier Transform (IFFT) operations in software as well as other signal processing functions. Processing circuit 115 executes a program 139 of processor-executable instructions stored in memory 116. High-speed memory 117, first bus 119 and processing circuit 115 together form a Tightly Coupled Memory (TCM) system. Processing circuit 115 can read from and write to high-speed memory 117 across first bus 119. The DSP and the general purpose processor are referred to together as processing circuit 115 in the following discussion.

In the example of FIG. 3, processing circuit 115 controls the various sub-circuits 122-125 and 131-134 of the receive and transmit channels using what are called "task lists". A task list includes one or more task instructions. In the illustration, four task lists TL1, TL2, TL3 and TL4 are shown stored in memory 117. Task list TL1 contains task instructions for the transmit channel 114. Task list TL2 contains task instructions for FFT WCSMSC 123. Task list TL3 contains task instructions for DEMOD WCSMSC 124. Task list TL4 contains task instructions for DDE WCSMSC 125. Each task list contains a sequence of task instructions for execution by an associated sub-circuit. The sub-circuit includes a task manager circuit that is coupled to second bus 120 as well as an amount of dedicated functional circuitry for performing the data processing operation of the circuit. The task manager reads a task instruction from its associated task list, and interprets an opcode and various fields of the task instruction, and then controls the associated hardware of the dedicated functional circuitry to perform an operation as indicated by the task instruction. By placing appropriate task instructions into the task list for a particular sub-circuit, processing circuit 115 can cause the dedicated functional circuitry of a particular sub-circuit to perform a particular operation specified by the processing circuit. Processing circuit 115 can write task instructions into these task lists, modify these task lists, delete task lists, and otherwise maintain the task lists as desired via first bus 119. Each task list is maintained in memory 117 in a circular buffer. The task manager for DEMOD WCSMSC 124 in FIG. 3 is identified by reference numeral 140. The associated dedicated functional circuitry controlled by task manager 140 includes a Minimum Mean Squared Error estimation (MMSE) demodulator 204A, a Maximal Ratio Combining (MRC) demodulator 204B, and channel estimation (CE) circuitry 257.

FIG. 4 is a diagram that illustrates incoming time domain samples received from ADC 109. These time domain samples pass through front end 122 and into sample buffer 126. The numbers 1, 2, 3 and so forth above the illustrated stream of horizontally extending dots in FIG. 4 are indices of the corresponding samples in the incoming stream of samples. The dots represent the samples themselves. Each sample includes an I value and a Q value. In the illustrated example, a sequence of 1024 time domain samples is received, followed by a number of samples of a cycle prefix. Then after the cyclic prefix, another set of 1024 time domain samples is received, and so on. The samples of FIG. 4 are samples corresponding to a portion of a frame. FFT WCSMSC 123 (see FIG. 3) processes each successive set of 1024 samples and generates a corresponding set of 1024 values that together represent an OFDM symbol. The cyclic prefix samples are not processed by the FFT WCSMSC 123 but rather are ignored. Arrow 200 indicates that the sample values 0 to 1023 in the symbol buffer 127 make up a single OFDM symbol.

FIG. 5 is a diagram that illustrates a two-dimensional frame 201 of processed sample values in symbol buffer 127. The vertical dimension in FIG. 5 can be considered to be a frequency axis. Values in different rows are therefore of different frequencies. The different frequencies are also referred to in the art as different "tones." An integer index "f" can be defined to be a frequency index to indicate one of the frequency rows. An "f" value of "0", for example, indicates the lowest row in FIG. 5. An "f" value of "1", for example, indicates the next higher row in FIG. 5, as so forth.

The horizontal dimension in FIG. 5 can be considered to be a time axis with time extending from left to right. In the example of FIG. 5, there are eight OFDM symbols in the one frame illustrated, and each OFDM symbol of this frame includes 1024 sample values, where each sample value in turn includes an I value portion and a Q value portion. One of the 1024 sample values can also be referred to as a modulation symbol value.

The frame 201 includes two kinds of sample values, "pilot" samples values and "data" sample values. In FIG. 5, a pilot sample value is represented by a dot symbol, whereas a data sample value is represented by an "X" symbol. In the type of wireless communication system described here, a base station is in communication with a plurality of mobile communication devices. The base station may periodically transmit a type of communication that has the frame structure as illustrated in FIG. 5 where each mobile communication device is to receive and demodulate all of the sample values of the frame. This frame is referred to as a broadcast frame. The broadcast frame is filled with control data values and pilot values. The pilot values, that are referred to as "common pilots" or "broadband pilots", are interspersed with the data values in a regular known pattern over the majority of the frequency range of the frame. The transmitter in the base station transmits the pilots at frequency-to-time locations in the frame of FIG. 5 that are known to the receiving mobile communication devices. The values of the pilots are also known to the receiving mobile communication devices. The receiver in a receiving mobile communication device receives the sample values of the frame, and identifies the pilot values at the known frequency-to-time locations. The pilots are perturbed by the wireless channel between the transmitting base station and the receiving mobile communication device as well as by noise and interference. The receiver estimates the effect of this perturbation on each data value in the frequency-to-time grid of FIG. 5, and this process is generally referred to as channel estimation. By applying the channel estimate value to the corresponding data values received, the demodulator can remove deleterious effects the channel had on the transmitted data values. In the frame of FIG. 5, there are many broadband pilots that are distributed throughout most of the area of the grid. A first channel estimation method referred to here as the "broadband pilot channel estimation and demodulation" method, as is described in further detail below, is usable to perform channel estimation on a frame having many such broadband pilots.

FIG. 6 is a diagram that illustrates another type of frame 202. Unlike the broadcast frame 201 of FIG. 5, the frame 202 of FIG. 6 only includes pilots in a relatively small frequency-to-time "tile" 203. This tile 203 includes user data destined for one mobile communication device. The pilots in this tile 203 are commonly referred to as "dedicated pilots" or "narrowband pilots." They are narrowband because they do not cover the frequency range of the frame. The receiver in the mobile communication device need not attempt to demodulate and use values located outside the tile because those values are not being communicated to the particular mobile communication device. Due to the fewer number of narrowband pilots in tile 203 as compared to the larger number of broadband pilots in frame 201, the first channel estimation method cannot be used. A second channel estimation method referred to here as the "planar estimation and interpolation" method, as is described in further detail below, is used to perform channel estimation on a tile involving the smaller number of narrowband pilots of FIG. 6.

Figure 7:
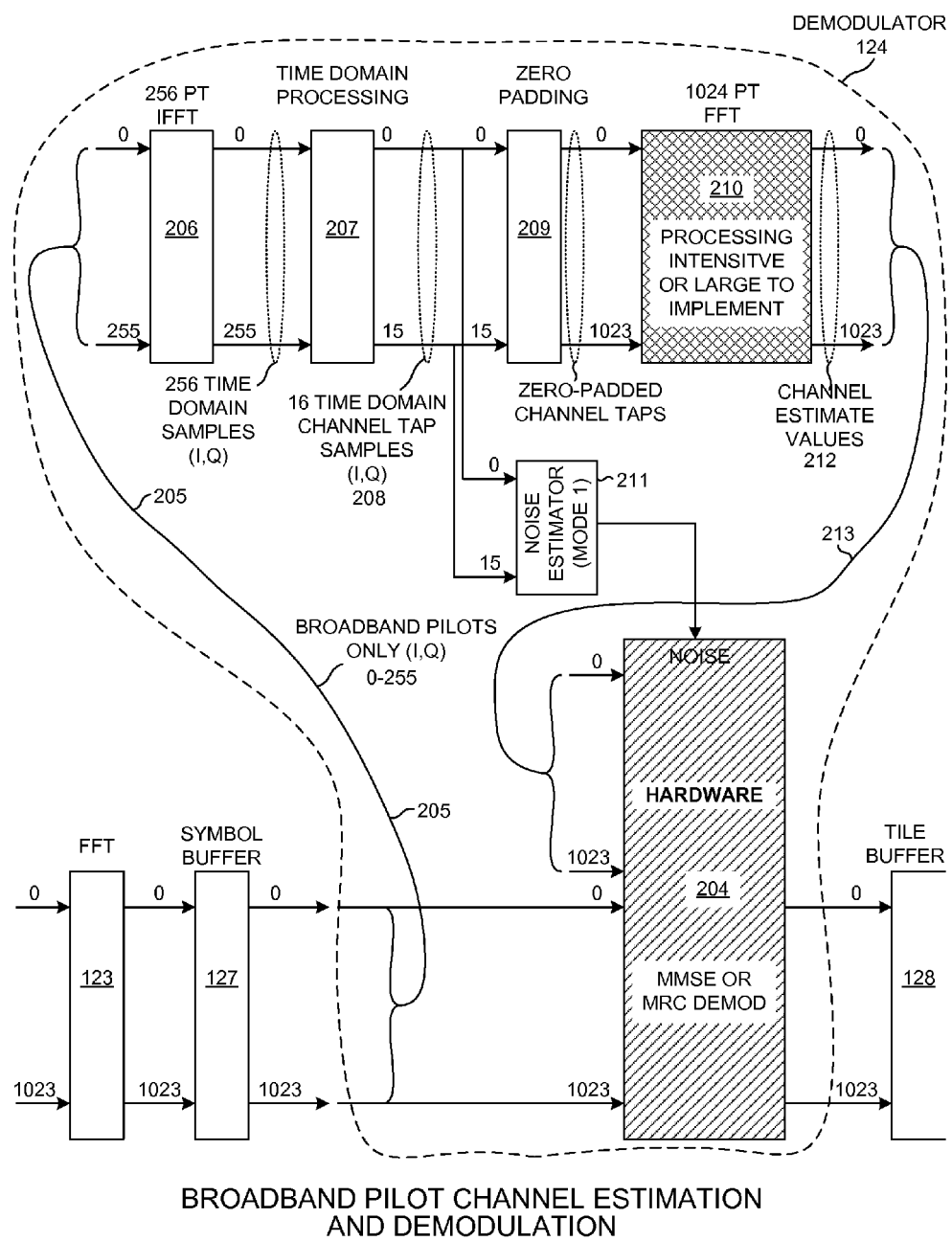
FIG. 7 is a diagram of a "broadband pilot channel estimation and demodulation" method and circuit.

FIG. 7 is a diagram that illustrates the "common pilot channel estimation and demodulation" method. The FFT block 123 and symbol buffer block 127 in the lower left of FIG. 7 represent the FFT WCSMSC 123 and symbol buffer 127 of FIG. 3. The 1024 values of a symbol as in the example of FIG. 5 pass from symbol buffer 127 to the right to the MMSE or MRC demodulator block 204. The MMSE demodulator 204A and the MRC demodulator 204B pictured in FIG. 3 are located in MMSE or MRC demodulator block 204 of FIG. 7. Each of the symbol values (I,Q) passing into MMSE or MRC demodulator block 204 from symbol buffer 127 is multiplied by a different "channel estimate value" to generate a demodulated symbol value (I,Q) and a signal-to-noise (SNR) value that are then written into tile buffer 128. The tile buffer 128 in the lower right of FIG. 7 is the tile buffer 128 of FIG. 3.

The locations of the broadband pilots within the frame as the frame is stored in symbol buffer 127 are known to processing circuit 115 (see FIG. 3). Processing circuit 115 implements the channel estimation functionality of blocks 206, 207, 209, 210 and 211 in firmware or software. Processing circuit 115 therefore places a symbol buffer push task instruction into the task list TL3 for the demodulator WCSMSC 124 of FIG. 3. The task manager 140 of demodulator WCSMSC 124 retrieves the symbol buffer push task instruction via second bus 120 and interprets the task instruction. The symbol buffer push task instruction includes fields that indicate all the locations of all the broadband pilot values in the frame within symbol buffer 127. Execution of the demodulation push task instruction causes these broadband pilot values to be pushed into high-speed memory 117 for further processing by processing circuit 115.

Figure 8:
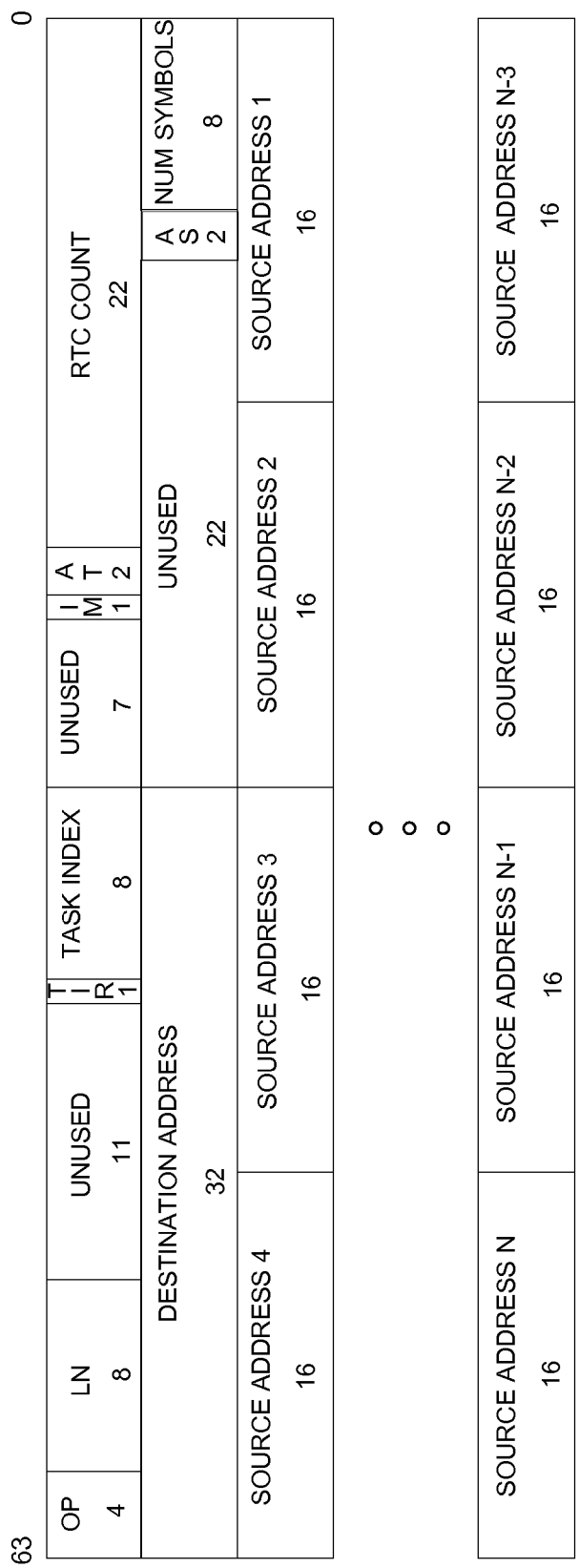
FIG. 8 is a diagram of a symbol buffer push task instruction.

FIG. 8 is a diagram of the symbol buffer push task instruction. In FIG. 7, the pushing of the broadband pilots is represented by line 205. If the pilots are scrambled, then an initial descrambling operation is performed. The descrambled 256 broadband pilot values are then passed through a 256-point Inverse Fast Fourier Transform (IFFT) function 206 to generate 256 time domain sample values that represent the impulse response of the channel. Each of these 256 time domain sample values includes an I portion and a Q portion. The 256 time domain sample values output by the IFFT function 206 are then threshold adjusted by function 207 to identify the sixteen strongest pilots. This is done by moving a 16-tap tall window (or "sliding" the window) one tap at a time upward through the 256 time domain samples to find the window position that corresponds to the maximum output energy. In one example, adaptive tap thresholding is preformed by examining the interference power and the profile of the actual tap values to decide upon the number of identified time domain tap samples to pass. In the example of FIG. 7, sixteen time domain tap sample values 208 identified using the sliding window and the thresholding described above are then supplied to a zero padding function 208. The value $k_{START}$ is an integer index that identifies the tap position of the bottom of the siding window when the final position of the sliding window has been determined. The value $k_C$ is an index that identifies one of the tap positions within the window that identifies the center position within the window of the average combined energy of all the tap values within the sliding window once the sliding window is in its final position. Zero padding function 208 adds zeros values to the sixteen time domain tap sample values to generate a complete set of 1024 zero-padded time domain samples. A 1024-point FFT function 109 converts these time domain tap samples back into the frequency domain to generate 1024 "channel estimate" values. Line 213 represents the supplying of the 1024 channel estimate values to the MMSE or MCR demodulator block 204. Referring back to FIG. 7, a noise estimator function 211 uses the sixteen time domain tap sample values 208 to generate a single noise estimation value for the frame. The MMSE or MRC demodulation block 204 uses the channel estimates and the noise estimation value to demodulate the data symbol values (I, Q) of the frame into demodulated symbol values (I, Q and SNR) that are written into tile buffer 128.

Figure 10:
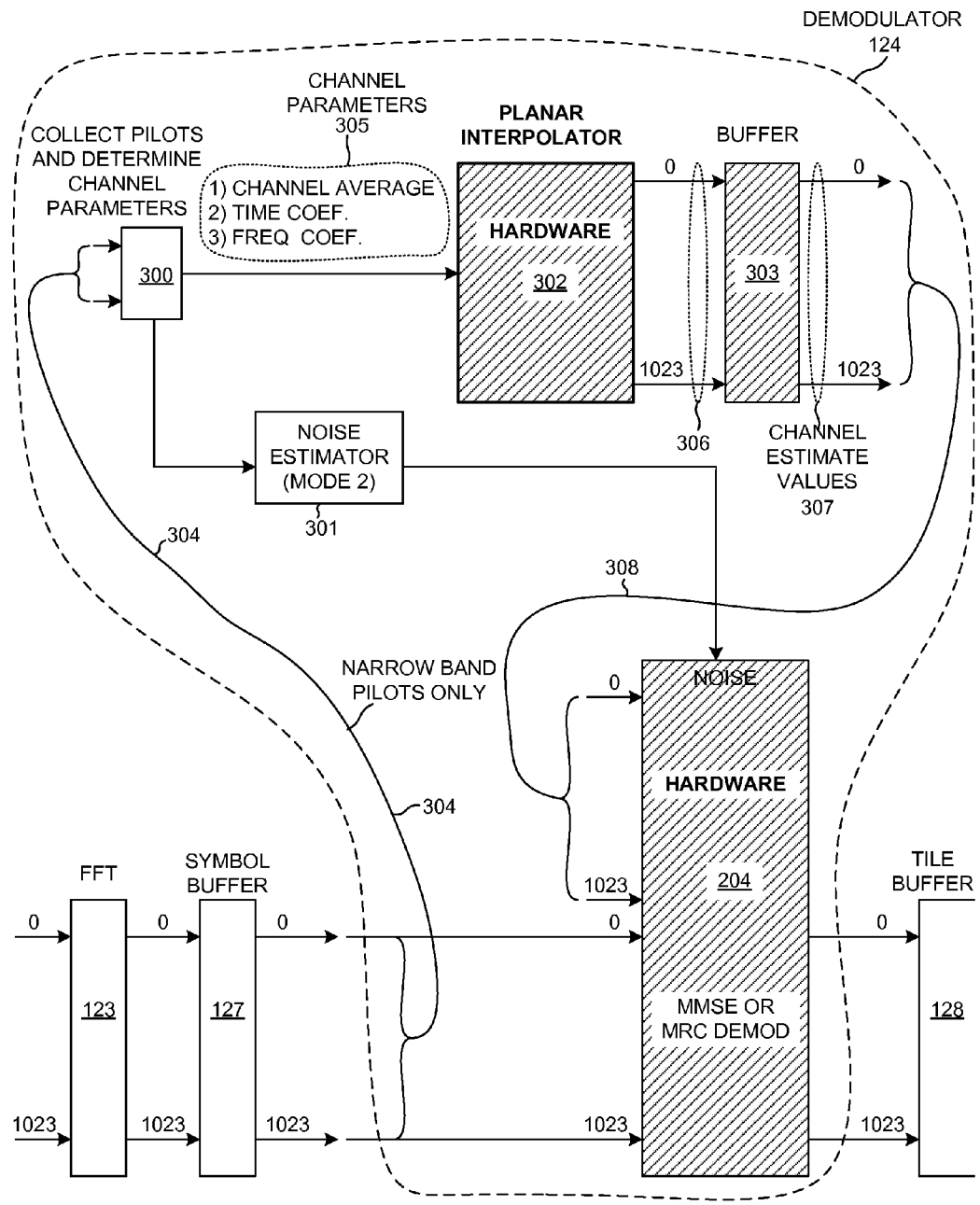
FIG. 10 is a diagram of a "planar estimation and interpolation" method and circuit.

FIG. 10 is a diagram that illustrates the "planar estimation and interpolation" method. Processing circuit 115 implements the channel estimation functionality of function blocks 300 and 301. Blocks 302, 303 and 204 are, however, implemented in hardware. The hardware of blocks 302 and 303 is located in the channel estimate (CE) block 257 of DEMOD WCSMSC 124 of FIG. 3.

Processing circuit 115 knows the locations of the narrowband pilot values as they are stored in symbol buffer 127. Processing circuit 115 therefore places a symbol buffer push task instruction into the task list TL3 for the demodulator WCSMSC 124 of FIG. 3. The task manager 140 of demodulator WCSMSC 124 retrieves the symbol buffer push task instruction via second bus 120, interprets the task instruction, and causes the dedicated pilot values to be pushed into high-speed memory 117 (see FIG. 3). In FIG. 9, the pushing of the narrowband pilots is represented by line 304. The narrowband pilots are analyzed by a collect pilots and channel parameter estimation function 300 to determine three channel parameter values 305: 1) a channel average (CA) value, 2) a time coefficient or time slope (Delta T) that represents the slope of channel variation across time, and 3) a frequency coefficient or frequency slope (Delta F) that represents the slope of channel variation across frequency. The CA value is determined in one example by averaging the values of all the narrowband pilots in the tile, and then applying a scaling factor. The Delta T value is determined in one example by averaging the pilot values of each symbol time separately (the values in each of the eight columns in FIG. 6), and then comparing these averages, one to the next, to determine a slope value for how the averages change as a function of increasing time. There is one such Delta T value for each user tile. Similarly, the Delta F value is determined in one example by averaging the pilot values of one tone (one frequency) across all eight symbol times. When such an average is calculated for each of the tones, then these averages are compared, one to the next, to determine a slope value for how the averages change as a function of increasing frequency. There is one such Delta F value for each user tile. The discussion here of how the three values may be obtained is simplified, and in practice the values may also be scaled. Processing circuit 115 supplies the three determined parameter channel values 305 to planar interpolator hardware 302.

FIG. 9 is a diagram of a DEMOD MMSE task instruction used to supply channel parameter values 305 from processing circuit 115 to the MMSE demodulator (in the DEMOD WCSMSC 124) if the MMSE demodulator is being used. If the MRC demodulator is being used, then a similar DEMOD MRC task instruction (not shown) is employed. The hardware planar interpolator hardware 302 computes CA+y*(Delta F)+x*(Delta T) to determine the channel estimate value for the tone located at frame coordinate (x,y), where x is the symbol number (time offset), and where y is the tone number (index "f"). The channel estimate value for the lower-left corner of the tile is therefore CA. The channel estimate value for the next position up in the tile along the left edge of the tile is therefore CA+(1*Delta F). The channel estimate value for the next position up the tile along the left edge of the tile is therefore CA+(2*Delta F). Similarly, in the time dimension (the horizontal dimension), the channel estimate value for the lower-left corner of the tile is CA. The channel estimate value for the next position to the right along the bottom edge of the tile is CA+(1*Delta T). The channel estimate value for the next position to the right along the bottom edge of the tile is CA+(2*Delta T). The three channel parameters 305 can therefore be thought of as defining a plane in three-dimensional space. The plane has a slope in the frequency dimension, and the plane has a slope in the time dimension.

In FIG. 10, the resulting 1024 determined channel estimate values are identified by reference numeral 306. Eight sets of these values 306 are buffered in buffer 303. These channel estimate values 306 are supplied as sets of 1024 channel estimate values 307 to the MMSE or MRC demodulator block 204. Line 308 represents the supplying of the 1024 channel estimate values 307 to the MMSE or MRC demodulator block 204. In this example, blocks 302, 303 and 204 are implemented in hardware in DEMOD WCSMSC 124 of FIG. 3 and the communication of values from one of these blocks to the next occurs by dedicated signal conductors within DEMOD WCSMSC 124. A noise estimator function 301 is implemented in firmware. Noise estimator function 301 uses narrowband pilots to determine an estimated noise value for the frame, and this estimated noise value is supplied to the MMSE or MRC demodulator block 204. The data symbol values (I,Q) in the user tile (see user tile 203 of FIG. 6) are then demodulated by MMSE or MRC demodulator 204 into demodulated symbols values (I,Q) and an SNR value that are written into tile buffer 128.

Figure 11A:
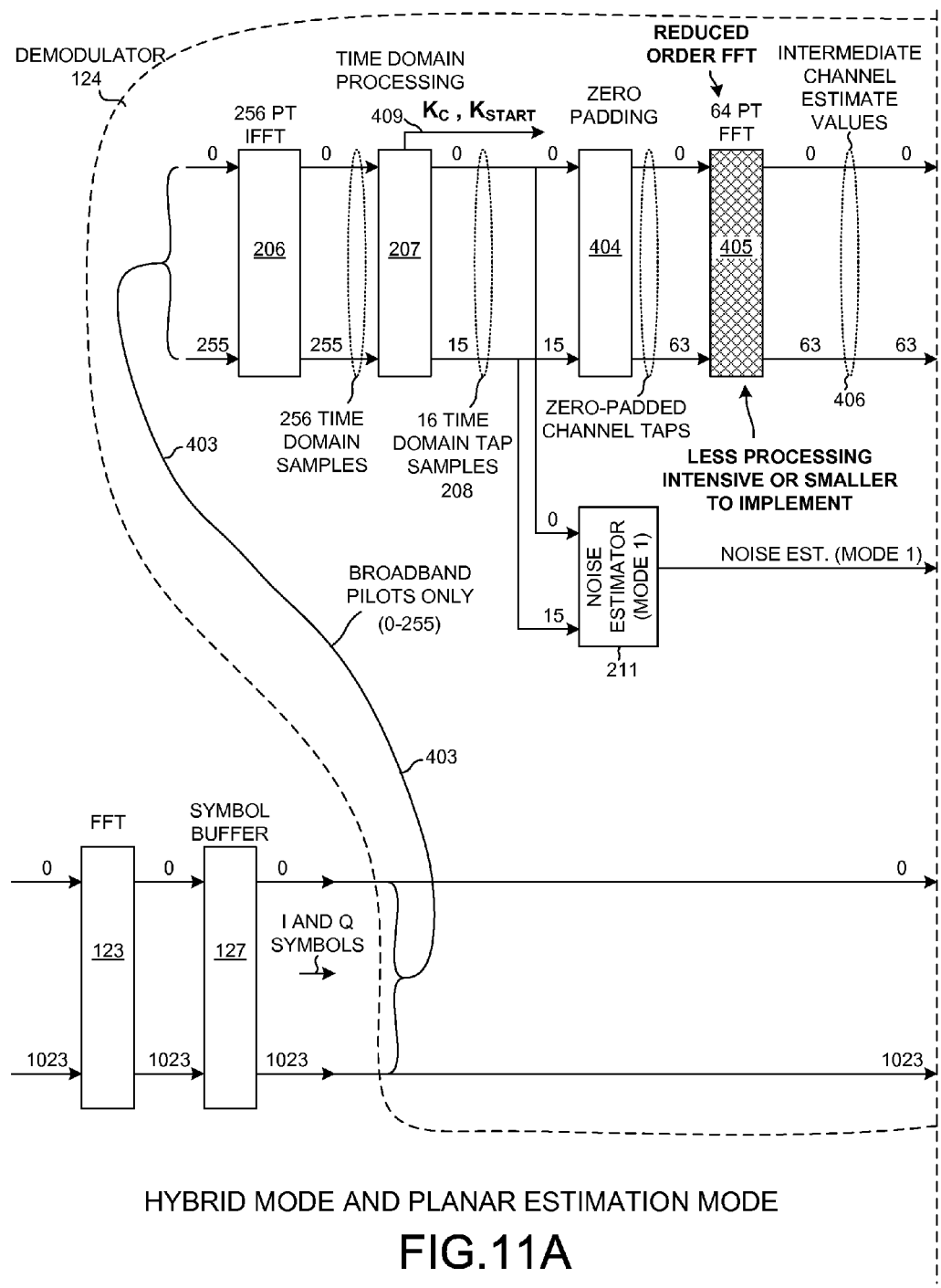
FIGS. 11A and 11B together form a diagram that illustrates a novel method and a novel demodulator WCSMSC 124 that can perform channel estimation in the "broadband pilot" situation illustrated in FIG. 5, as well as in the "narrowband pilot" situation illustrated in FIG. 6, but does not require the large 1024-point FFT 210 of FIG. 7.
Figure 11B:
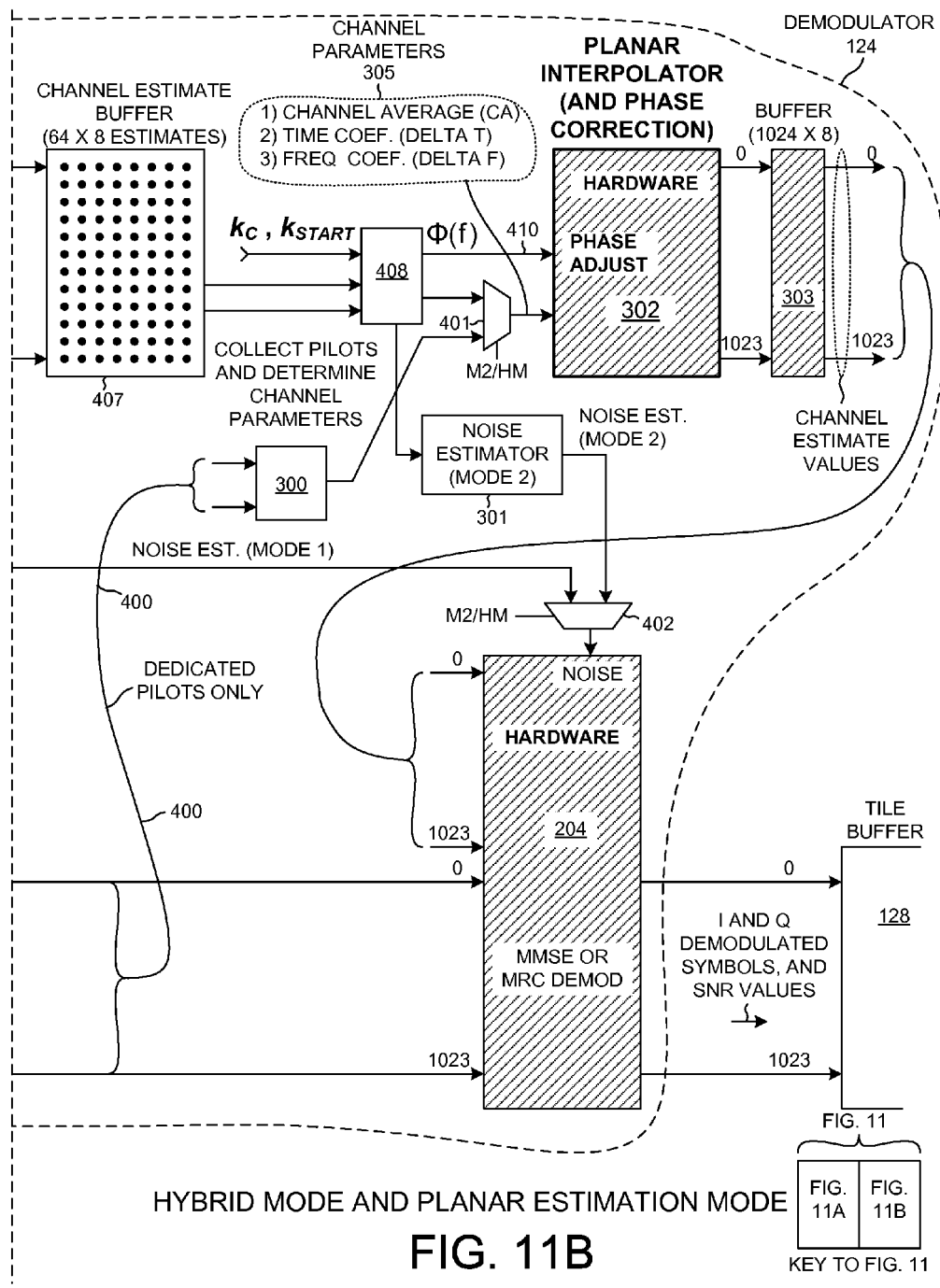

FIGS. 11A-11B together form FIG. 11. FIG. 11 is a diagram that illustrates a novel method and demodulator WCSMSC 124 that can perform channel estimation in the "broadband pilot" situation illustrated in FIG. 5, as well as in the "narrowband pilot" situation illustrated in FIG. 6, but does not involve the undesirably large 1024-point FFT 210 of FIG. 7. Demodulator WCSMSC 124 is operable in a novel hybrid mode (a broadband pilot mode) and in the planar estimation and interpolation mode (a narrowband pilot) of FIG. 9. The functionality of FIG. 7 and FIG. 9 is not implemented in the digital baseband integrated circuit 103, but rather the functionality of novel FIG. 11 is implemented.

Operation of the demodulator of FIG. 11 in the planar estimation and interpolation mode is similar to the operation of the planar estimation and interpolation method and circuit described above in connection with FIG. 9. Narrowband pilot values of the user tile are pushed to processing circuit 115 as represented by line 400. Blocks 300, 301, 302, 303, and 204 of FIG. 11 are the same blocks as blocks 300, 301, 303 and 204 of FIG. 9. Multiplexer function 401 is controlled such that the CA value, the time coefficient or time slope value (Delta T), and the frequency coefficient or frequency slope value (Delta F) generated by function block 300 are supplied to the planar interpolator hardware 302. Multiplexer function 402 is controlled such that the noise estimate from noise estimator 301 is supplied to the MMSE or MRC demodulator 204.

The demodulator of FIG. 11 is, however, also operable in a novel "hybrid mode." Operation in the hybrid mode utilizes much of the function processing of the broadband pilot channel estimation and demodulation method and circuit described above in connection with FIG. 7, except that the planar interpolator hardware 302 is employed such that the 1024-point large and processing-intensive FFT function 210 of FIG. 7 is not required. In FIG. 11, the broadband pilot values are pushed to processing circuit 115 as represented by line 403. This involves the use of a DEMOD push task instruction as explained above in connection with FIG. 7. The processing of function blocks 206, 207 and 211 of FIG. 11 is the same as the processing of function blocks 206, 207 and 211 of FIG. 7 as described above. The value $k_{START}$ output from the time domain processing 207 indicates the position of the bottom of the 16-tap sliding window when the sliding window is in its final position. The value $k_C$ output from the time domain processing 207 indicates a center-of-energy position within the sliding window as described above in connection with FIG. 7. Zero padding function block 404, however, pads zero values to expand the sixteen time domain tap sample values 208 up to a smaller set of sixty-four time domain values, rather than up to a larger set of 1024 time domain values as in the case of FIG. 7. A smaller 64-point FFT function 405 then operates on the set of sixty-four time domain tap sample values to generate sixty-four intermediate channel estimate values 406. 1024 channel estimate values are, however, required by MMSE or MCR demodulator 204.

The sixty-four intermediate channel estimate values output by 64-point FFT 405 are expanded into 1024 channel estimate values using the existing planar interpolator hardware 302. The intermediate channel estimate values 406 are stored into a buffer 407, referred to here as a channel estimate buffer. Rather than function block 300 collecting pilots and performing channel parameter estimation on pilots extracted from symbol buffer 127 as in the planar estimation mode and interpolation mode, function block 408 in the hybrid mode collects pilots, analyzes them, and determines channel parameters that are used by planar interpolator hardware 302 such that two-dimensional interpolation results. In the present example, function block 408 analyzes the intermediate channel estimate values from channel estimate buffer 407 and calculates three channel parameter values 305 (a channel average value (CA), a time coefficient or time slope value (Delta T), and a frequency coefficient or frequency slope value (Delta F)). The three channel parameter values 305 are determined by processing represented here by function block 408. Multiplexing function block 401 represents this supplying of the determined three parameters, as opposed to the supplying of channel parameters from function block 300, to the hardware planar interpolator 302. The parameters are communicated by placing the calculated parameters into a DEMOD MMSE task instruction, and having the task manager 140 of the DEMOD WCSMSC 124 read the task instruction and supply the channel parameters to the hardware interpolator 302. Similarly, in the hybrid mode, multiplexer function 402 is controlled to couple the noise estimate from noise estimator 301 to the noise input of MMSE or MRC demodulator 204.

In addition, as indicated in FIG. 11B, processing circuit 115 determines the phase ramp parameters $k_C$ and $k_{START}$ as depicted by arrow 409. These parameters are usable to define a phase ramp that compensates for a time offset for a given block of OFDM data. This time offset (expressed as $\tau_d$) is determined for each block of OFDM information, and a respective phase adjustment coefficient (phase correction coefficient) is calculated for each frequency in an OFDM block according to Equation (1), $$D_k = \exp(-j2\pi f_k \tau_d) \text{ Equation} \qquad (1)$$

where $f_k$ can be any frequency sub-carrier in an OFDM signal. Time offset correction is then performed in the frequency domain by multiplying each frequency band of a post-FFT signal by $D_k^{-1}$, the reciprocal of the above phase adjustment coefficient, to effectively shift the signal in the time domain back to where it should have been had no offset occurred. See Equation (13) below for further details.

Equation-Based Description of the Hybrid Mode:

The frequency impulse response $N_{FFT}$ of the channel is given by a 1024-point FFT in accordance with Equation (2) below:

$$H_l^a = \text{FFT}_{1024}\{h_k^a\}. \text{ Eq} \qquad (2)$$

In the notation used here, $N_{FFT}$ is the number of tones in the preamble. These tones are indexed $0, 1, \ldots N_{FFT}-1$. The value $\{h_k^a\}$ is the time domain channel estimate value, where $k=0, 1, \ldots, N_p-1$. The value "a" is an antenna index. If there is only one antenna as in the present example, then the index "a" has only one value and can be ignored. $N_p$ is the number of pilots in each F-PPICH OFDM symbol. The time domain channel estimate value has an unaccounted-for phase-ramp owing to the FFT window position. The true phase-adjusted channel estimate is obtained by multiplying the value $\{h_k^a\}$ by the following quantity:

$$\exp\left(\frac{j2\pi(I_s + I_p)k}{N_{FFT}}\right) \qquad \text{Eq (3)}$$

In Equation (3), $I_p$ is an absolute index of the first preamble tone. For this tone, the preamble tone index is zero. The "p" is not a numerical index, in contrast to the "s" in $I_s$. $I_s$ is the least preamble tone occupied by F-PPICH (in terms of $N_{FFT}$ indexing) F-PPICH OFDM symbols s, s=0,1. Thus, the F-PPICH in F-PPICH OFDM symbols s occupies tones indexed $k\Delta + I_s$, $k = 0, 1, \ldots, N_p - 1$. Note that $I_s$ takes values $0, 1, \ldots \Delta - 1$, and that $I_1 = (I_0 + (\Delta/2)) \bmod \Delta$. The symbol $\Delta$ is the pilot spacing in tones and is equal to $N_{FFT}/N_p$, and takes the value 2 for the present example.

The frequency impulse response $N_{FFT}$ can be written as set forth in the Equations (4)-(6) below if $N_{TILE} = N_{FFT}/N_W = 16$, where $N_{TILE}$ is the number of tones in a tile.

$$H_l^a = \frac{1}{\sqrt{N_{FFT}}} \sum_{k=0}^{N_{FFT}-1} h_k^a \exp\left(-j\frac{2kl\pi}{N_{FFT}}\right) \qquad \text{Eq (4)}$$

-continued $$H_l^a = \frac{1}{\sqrt{N_{FFT}}} \sum_{k=k_{start}}^{(k_{START}+N_W-1) \bmod N_{FFT}} h_k^a \quad \text{Eq (5)}$$

$$\exp\left(-j\frac{2(k-k_{START})l\pi}{N_{FFT}}\right)\exp\left(-j\frac{2k_{START}l\pi}{N_{FFT}}\right)$$

$$H_l^a = \frac{1}{\sqrt{N_{FFT}}} \exp\left(-j\frac{2k_{START}l\pi}{N_{FFT}}\right) \quad \text{Eq (6)}$$

$$\sum_{k=0}^{N_W-1} h_{(k+k_{START}) \bmod N_{FFT}}^a \exp\left(-j\frac{2kl\pi}{N_W N_{TILE}}\right)$$

If $m=l/N_{TILE}$, then the following Equations (7)-(8) are given:

$$H_m^a = \frac{1}{\sqrt{N_{FFT}}} \exp\left(-j\frac{2k_{START}m\pi}{N_W}\right) \sum_{k=0}^{N_W-1} h_{k+k_{START}}^a \exp\left(-j\frac{2km\pi}{N_W}\right) \quad \text{Eq (7)}$$

$$H_m^a = \frac{1}{\sqrt{N_{TILE}}} \exp\left(-j\frac{2k_{START}m\pi}{N_W}\right) FFT_{N_W}\{h_{k+k_{START}}^a\} \quad \text{Eq (8)}$$

The sixty-four channel estimate values 406 output by the 64-point FFT 405 of FIG. 11 are therefore given by the following Equation (9), where the value "m" ranges from zero to sixty-three.

$$\tilde{H}_m^a = FFT_{N_W} h_{k+k_{START}}^a \quad \text{Eq (9)}$$

These sixty-four channel estimate values 406 are used to obtain the frequency coefficient (or frequency slope or Delta F) and the time coefficient (or time slope or Delta T), with $H_0^a = H_{N_W}^a$ used to compute the last slope. The value $k_C$ is an integer index as described above, and it is a number that would ideally be the center position of the DC component within the small ($N_W$) FFT window ($k_C$ is given relative to the current value of $k_{START}$) determined to minimize the error introduced by linear interpolation of the frequency representation of the channel that is represented in time by the post-thresholding taps. The phase rotation introduced by a shift in time is separated from the linear interpolation.

The three channel parameter values 305 for the mth sixteen-tone tile (i.e., the tile with tones indexed from 16 m to 16 m+15, m=0, ..., $N_W$) are determined as set forth below in Equations (10), (11) and (12). Equation (10) sets forth how the channel average (CA) component is calculated. Equation (11) sets forth how the frequency coefficient (or frequency slope or Delta F) is calculated. Equation (12) sets forth how the time coefficient (or time slope or Delta T) is calculated. The "m" is an integer index that identifies the tile within the frame. Accordingly, a difference set of the three parameter values is calculated for each tiles as indicated by its "m" index value. In the present example, the time coefficient is set to zero, but in other embodiments the time coefficient is determined in a similar manner to how the frequency coefficient is determined in Equation (11) such that interpolation occurs in two-dimensions both over time (the horizontal dimension in the illustrations of FIG. 5 and FIG. 6) as well as over frequency (the vertical dimension in the illustrations of FIG. 5 and FIG. 6).

$$H_c^a = \frac{1}{\sqrt{N_{TILE}}} \exp\left(-j\frac{2k_{START}\pi}{N_W}\right)\tilde{H}_m^a / \tilde{\sigma}_a \quad \text{Eq (10)}$$

$$H_{\Delta f}^a = \frac{1}{\sqrt{N_{TILE}}} \left(\exp\left(j\frac{2k_C\pi}{N_W}\right)\exp\left(-j\frac{2k_{START}m\pi}{N_W}\right)\tilde{H}_{m+1}^a - \quad \text{Eq (11)}$$

$$\exp\left(-j\frac{2k_{START}m\pi}{N_W}\right)\tilde{H}_m^a\right) / N_{TILE} / \tilde{\sigma}_a$$

$$H_{\Delta t}^a = 0 \quad \text{Eq (12)}$$

In Equations (10), (11) and (12) above, the calculated three channel parameter values are phase adjusted. In Equation (10), the exponential quantity is the phase adjustment coefficient. In Equation (11), the first exponential quantity is the phase adjustment coefficient.

$$\Phi[f] = \exp\left(-j\frac{2\pi(k_C + k_{START})f}{N_{FFT}}\right), \quad \text{Eq (13)}$$

with $f = 0, \ldots, N_{TILE} - 1$

Equation (13) above is an equation usable to calculate the phase adjustment coefficients $\Phi(f)$. In the equation, the value "f" is an integer frequency (tone) index that indicates the frequency (tone) within the tile for which the phase adjustment coefficient $\Phi(f)$ is computed. The value $N_{TILE}$ is the number of tones for which the channel value is computed by the linear interpolator. In other words, there are ($N_{TILE}-1$) tones for which the channel values are unknown and are computed by the interpolator. In the example of FIG. 11, $N_{TILE}$ is sixteen because there are sixty-four values supplied to planar interpolator 302, and the interpolator is to output 1024 values. For example, to determine the phase adjustment coefficient $\Phi(f)$ for the third tone (data value) between the known channel values at tones 0 and 16, the value of "f" is three and the value of NFFT is 1024.

Conceptually, processing circuit 115 of FIG. 3 executes the program of processor-executable instructions 139 (see FIG. 3), thereby performing the calculations of Equations (10), (11), (12) and (13). Processing circuit 115 then causes the resulting three channel parameter values 305 to be supplied to planar interpolator hardware 302 in the DEMOD WCSMSC 124 using either the DEMOD MMSE task instruction or the DEMOD MRC task instruction. Planar interpolator 302 performs the last step of the interpolation function using the three parameters 305 to generate a two-dimensional array of channel estimate values. The vertical dimension of the array represents frequency, whereas the horizontal dimension represents time. The processing circuit 115, in addition to calculating the three parameters 305, also calculates a set of phase adjustment coefficients using Equation (13), where there is one phase adjustment coefficient $\Phi(f)$ calculated for each frequency index value "f", as "f" in incremented starting at zero. Processing circuit 115 supplies these phase adjustment coefficients to planar interpolator 302 by directly writing the calculated phase adjustment coefficients $\Phi(f)$ (one for each value of "f") across second bus 120 (see FIG. 3) into registers in hardware planar interpolator 302 as indicated by arrow 410 in FIG. 11. Planar interpolator 302 then uses the phase adjustment coefficients to multiply all the channel estimate values in the row of the two-dimensional array that corresponds to the frequency index value "f" by the same phase adjustment coefficient. Similarly, all the channel estimate values in the next row up in the two-dimensional array that corresponds to the next highest frequency index value "f"

are multiplied by the same next phase adjustment coefficient. The result of multiplying each row of the two-dimensional array of channel estimate values by an associated phase adjustment coefficient is a two-dimensional array of phase-adjusted channel estimate values. The phase-adjusted channel estimate values of this array are output from planar interpolator 302, and are buffered, and are supplied to demodulator 204 for use in demodulation. The flow of the phase-adjusted channel estimate values from planar interpolator 302, to buffer 303, and to MMSE or MRC demodulator 204 occurs via dedicated hardware conductors within the DEMOD WCSMSC 124.

Figure 12:
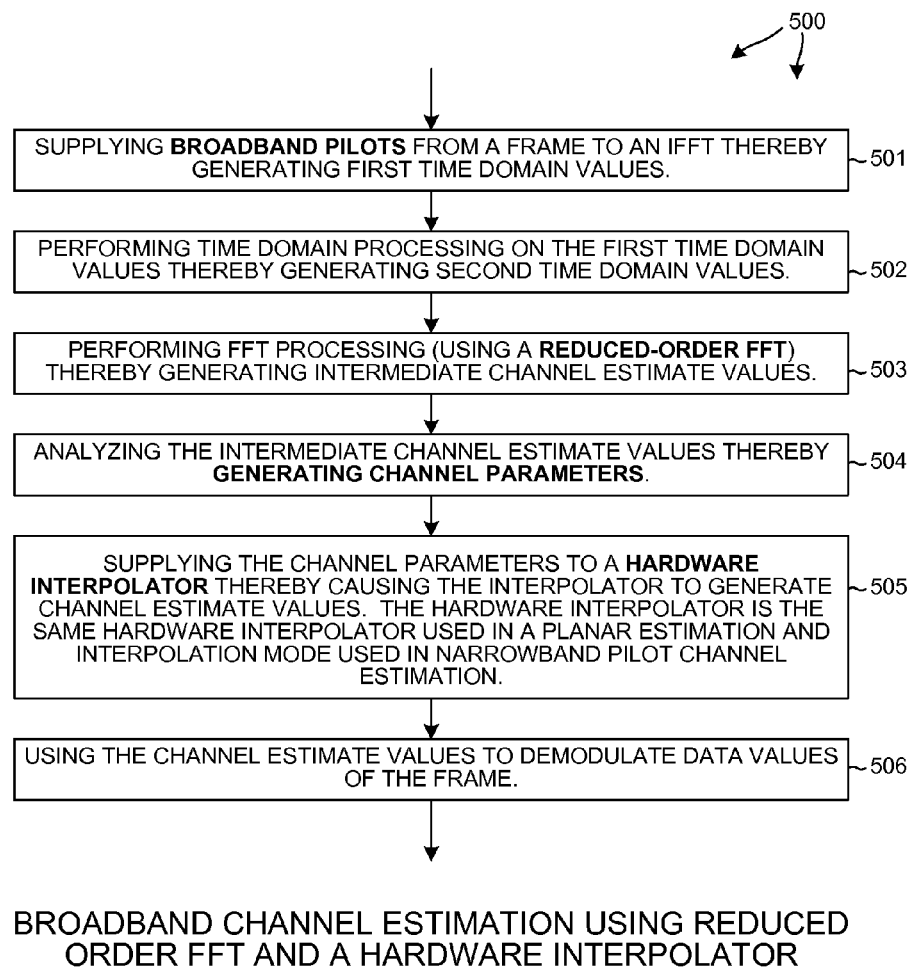
FIG. 12 is a simplified flowchart that illustrates the hybrid mode of operation of FIG. 11.

FIG. 12 is a flowchart of hybrid mode operation 500 of FIG. 11. Broadband pilot values are supplied (step 501) to an IFFT, thereby generating first time domain values. Time domain processing is performed (step 502) on the first time domain values, thereby generating second time domain values. In one example, the time domain processing includes functions 207 and 404 of FIG. 11. FFT processing is performed (step 503), thereby generating intermediate channel estimate values. In one example, these intermediate channel estimate values are buffered 407. The intermediate channel estimate values are analyzed (step 504), thereby generating channel parameters. In one example, the analyzing is represented by function block 408 and the channel parameters include a channel average value (CA), a frequency coefficient (Delta F), and a time coefficient (Delta T). The channel parameters are supplied (step 505) to a hardware interpolator such that the hardware interpolator generates channel estimate values. In one example, additional phase adjustment coefficients Φ(f), as determined by processing circuit 115 based on the sliding window values $k_C$ and $k_{START}$, are supplied to the hardware interpolator such that the hardware interpolator also performs phase adjustment on the channel estimates. The resulting phase-adjusted channel estimate values are used (step 506) to demodulate data symbol values (I,Q) of the frame. The channel parameters change from tile to tile within a frame, but the phase adjustment coefficients only change from frame to frame. In FIG. 11, the data symbol values are identified coming from symbol buffer 127 by the arrow labeled "I AND Q SYMBOLS." The demodulated data symbol values are identified going into the tile buffer 128 by the arrow labeled "I AND Q DEMODULATED SYMBOLS SNR VALUES."

Figure 13:
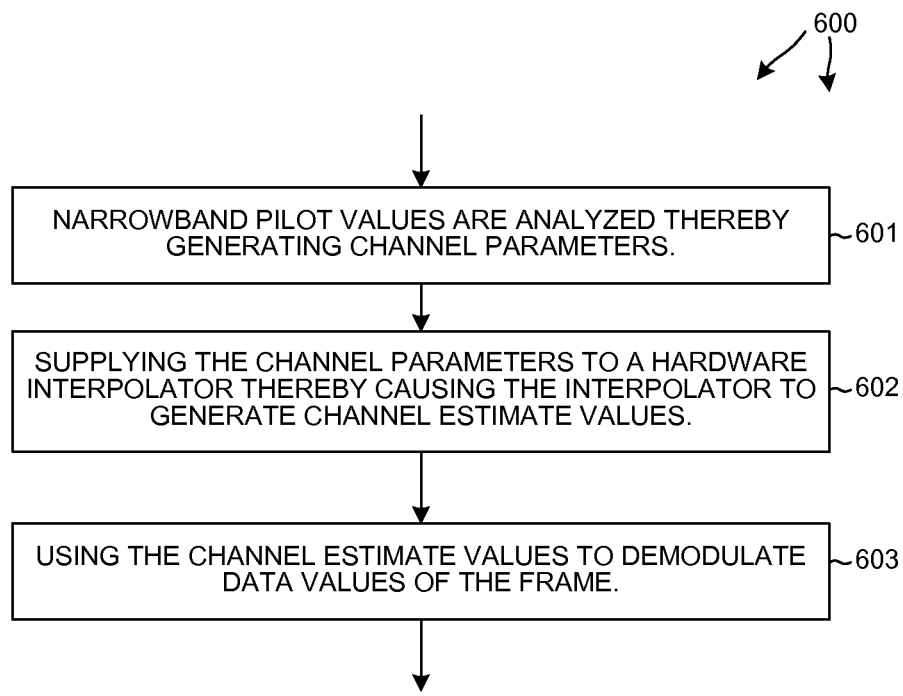
FIG. 13 is a simplified flowchart that illustrates the planar estimation and interpolation mode of operation of FIG. 11.

FIG. 13 is a flowchart of a planar estimation mode operation 600 of FIG. 11. Narrowband pilot values are analyzed (step 601), thereby generating channel parameters. In one example, this analyzing is represented by function block 300 in FIG. 11 and the channel parameters include a channel average value (CA), a frequency coefficient (Delta F), and a time coefficient (Delta T). The channel parameters are supplied (step 602) to the hardware interpolator, and the hardware interpolator generates therefrom channel estimate values. The channel estimate values are used (step 603) to demodulate data symbol values (I,Q) of the frame. In FIG. 11, the data symbol values are identified coming from the symbol buffer 127 by the arrow labeled "I AND Q SYMBOLS." The demodulated data symbol values are identified going into the tile buffer 128 by the arrow labeled "I AND Q DEMODULATED SYMBOLS SNR VALUES."

The techniques described herein may be implemented by various means. In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. In some examples, the hardware interpolator may perform linear interpolation, and in other examples the hardware interpolator may perform non-linear interpolation. Although some of the functions represented by functional blocks are performed in firmware/software whereas others are performed by dedicated hardware in the specific embodiment described above, the partitioning of what functions are performed in firmware/software and what functions are performed by hardware can be different in different embodiments. Accordingly, various modifications, adaptations, and combinations of the various features of the described specific embodiments can be practiced without departing from the scope of the claims that are set forth below.

What is claimed is:

1. A method comprising:
    (a) receiving a plurality of narrowband pilot values and generating therefrom a first plurality of channel parameters;
    (b) supplying the first plurality of channel parameters of (a) to a hardware interpolator such that the hardware interpolator generates a plurality of narrowband channel estimate values;
    (c) receiving a plurality of broadband pilot values and generating therefrom a second plurality of channel parameters;
        (c1) performing a Fast Fourier Transform (FFT) operation to generate a plurality of channel estimate values; and
        (c2) analyzing the plurality of channel estimate values generated by the FFT operation to determine the plurality of channel parameters; and
    (d) supplying the second plurality of channel parameters of (c) to the hardware interpolator such that the hardware interpolator generates a plurality of broadband channel estimate values.

2. The method of claim 1, wherein the plurality of channel estimate values generated by the hardware interpolator in (d) is a substantially greater number than is the plurality of channel estimate values generated by the FFT operation in (c1).

3. The method of claim 1, wherein a phase adjustment coefficient is generated and is supplied along with the second plurality of channel parameters of (c) to the hardware interpolator in (d).

4. The method of claim 1, further comprising:
(e) using the plurality of narrowband channel estimate values to demodulate a tile of values without demodulating an entire frame of which the tile is a part, wherein the narrowband pilot values are parts of the tile.

5. The method of claim 1, further comprising:
(f) using the plurality of broadband channel estimate values to demodulate an entire frame, wherein the broadband pilot values are parts of the frame.

6. The method of claim 1, wherein the narrowband pilot values of (a) have frequencies that do not span a majority of a frequency range of a first frame containing the narrowband pilot values, and wherein the broadband pilot values of (c) have frequencies that do span a majority of a frequency range of a second frame containing the broadband pilot values.

7. An apparatus comprising:
a hardware interpolator; and
means for controlling the hardware interpolator such that the hardware interpolator is used in both a broadband pilot channel estimation operation and in a narrowband pilot channel estimation operation;
wherein the means is for performing a Fast Fourier Transform (FFT) operation to generate a plurality of intermediate channel estimate values in the broadband pilot channel estimation operation, and is for analyzing the plurality of intermediate channel estimate values to generate a plurality of channel parameters, and is for supplying the plurality of channel parameters to the hardware interpolator such that the hardware interpolator outputs broadband pilot channel estimation values.

8. A computer program product, comprising:
a non-transitory computer-readable medium comprising:
code for causing a computer to use a hardware interpolator to perform interpolation as part of a broadband pilot channel estimation operation, wherein the code causes the computer to receive broadband pilot values, to perform an Inverse Fast Fourier Transform (IFFT) operation on the broadband pilot values and generate first time domain samples, to perform time domain processing on the first time domain samples and generate second time domain samples, to perform a Fast Fourier Transform (FFT) operation on the second time domain samples and generate intermediate channel estimate values, to analyze the intermediate channel estimate values to determine channel parameters, and to supply the determined channel parameters to the hardware interpolator.

9. The computer program product of claim 8, wherein the computer-readable medium further comprises:
code for causing the computer to use the hardware interpolator to perform interpolation as part of a narrowband pilot channel estimation operation.

10. A method for pilot channel estimation, comprising:
supplying a plurality of broadband pilot values as inputs to an Inverse Fast Fourier Transform (IFFT) function and generating first time domain values;
performing time domain processing on the first time domain values and generating second time domain values;
supplying the second time domain values to a Fast Fourier Transform (FFT) function and generating a first number of channel estimate values;
determining a frequency slope value from the first number of channel estimate values; and
supplying the frequency slope value to a hardware interpolator such that the hardware interpolator generates a second number of channel estimate values, wherein the second number is substantially greater than the first number.

11. The method of claim 10, wherein in addition to the frequency slope value a channel average value is determined from the first number of channel estimate values, and wherein the channel average value is supplied to the hardware interpolator along with the frequency slope value such that the hardware interpolator generates the second number of channel estimate values.

12. The method of claim 10, further comprising:
generating a phase adjustment coefficient and supplying the phase adjustment coefficient to the hardware interpolator.

\* \* \* \* \*